United States Patent [19]

Perrotti

[11] Patent Number: 5,179,261

[45] Date of Patent: Jan. 12, 1993

[54] SPLIT BEAM LASER WELDING SYSTEM

[75] Inventor: Patrick A. Perrotti, Newington, Conn.

[73] Assignee: Combustion Engineering Inc., Windsor, Conn.

[21] Appl. No.: 761,286

[22] Filed: Sep. 17, 1991

[51] Int. Cl.[5] ............................................. B28K 26/00
[52] U.S. Cl. ........................... 219/121.63; 219/121.74; 219/121.77; 219/121.64
[58] Field of Search ...................... 219/121.63, 121.64, 219/121.77, 121.75, 121.84

[56] References Cited

U.S. PATENT DOCUMENTS

| | | | |
|---|---|---|---|
| 4,250,372 | 2/1981 | Tani | 219/121.76 |
| 4,327,277 | 4/1982 | Daly | 219/121.64 |
| 4,574,180 | 3/1986 | Kasner et al. | 219/121.63 X |
| 4,879,090 | 11/1991 | Perrotti et al. | 376/462 |

Primary Examiner—C. L. Albritton
Attorney, Agent, or Firm—Ronald P. Kananen

[57] ABSTRACT

The laser beam welding of a spacer grid assembly is accomplished by dividing a laser beam (21) into at least two beam segments (37). These beam segments (37) are then routed around the mixing vanes (31) and focused below the vanes (31). The focus and coincidence (34) of the beam segments (37) may be moved down along the intersection to provide an elongated smaller diameter weld. The spacer grid assembly of the present invention has an improved Departure from Nucleate Boiling performance, increased strength against buckling, and a reduced detrimental effect on the coolant flow.

13 Claims, 4 Drawing Sheets

SPLIT BEAM LASER WELDING SYSTEM

FIELD OF THE INVENTION

This invention generally relates to a laser beam welding system. More specifically, this invention relates to the welding of spacer grids by a split beam laser welding system.

BACKGROUND OF THE PRIOR ART

Conventionally, laser welding has been performed with a single lens beam delivery system as shown, for example, in FIG. 1. In FIG. 1, an incoming collimated laser beam 1 from a suitable laser beam source is focused by a lens 2 onto a workpiece 3. The lens 2 converges the light to a focal point 4 at which point welding occurs. Such a beam delivery system can be used for welding in a nuclear fuel assembly.

A nuclear fuel assembly found in the core of a nuclear reactor is comprised of a spacer grid assembly. A typical spacer grid assembly is shown generally at the reference numeral 8 in FIG. 2. As shown in FIG. 2, the spacer grid assembly 8 is comprised of orthogonal sets of interior strips 10 having mixing vanes 11 as appendages. The interior strips 10 have supports 12 for the fuel rods. The orthogonal sets of the interior strips 10 are joined together by a plurality of upper intersection welds 13 and lower intersection welds 14. Prior to welding, sacrificial weld taps 15 are constructed at the intersections of the interior strips 10.

The mixing vanes 11 redirect the coolant so that the coolant flows around the fuel rods located at the fuel rod supports 12. In order to perform the upper intersection welds 13, cutouts must be made in the base of the mixing vanes 11 for the delivery of the laser beam. These cutouts in the mixing vanes, however, degrade the Departure from Nucleate Boiling (DNB) performance. U.S. Pat. No. 4,879,090 has a further discussion on how these cutouts degrade the DNB performance.

During a seismic event or a loss of coolant accident, the fuel assemblies impact against each other and also impact against the core shroud. A large portion of this impact is directly applied to the spacer grid assemblies. Therefore, the spacer grid assemblies must be strong enough so that they do not fail by buckling. Resistance to buckling is strongly influenced by the size and shape of the intersection welds.

From an examination of failed spacer assemblies, it has been determined that the transfer of a bending moment between orthogonal sets of the interior strips is limited by not only the welds, but by the interface between the weld and the parent strip material. Thus, a stronger spacer grid assembly can be assembled by providing larger interfaces between each weld and the interior strips. A larger weld with a larger weld diameter would produce a stronger spacer assembly. Although the strength of the spacer assembly would be increased, a larger weld diameter would have a detrimental effect on coolant flow.

Thus, it is a continuing problem in the art of nuclear welding to provide an improved method and apparatus for welding in a nuclear fuel assembly.

It is yet another problem in the art of nuclear welding to provide a spacer grid assembly which has a high buckling strength but which does not have a detrimental effect on the coolant flow.

It is yet another problem in the art of nuclear welding to provide a method of welding the spacing grid assembly which does not degrade the DNB performance.

SUMMARY OF THE INVENTION

It is an object of the present invention to provide a spacer grid assembly having an improved DNB performance.

It is another object of the present invention to provide a spacer grid assembly strengthened to reduce failure by buckling.

It is still another object of the present invention to provide a spacer grid assembly having an improved coolant flow.

It is still a further object of the present invention to provide a laser beam welding system which is capable of welding around obstacles.

It is yet another object of the present invention to provide a laser beam welding system which provides a symmetrical weld.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a split beam laser welding system according to this invention comprises a bifurcating mirror for splitting an incoming collimated laser beam into a plurality of beam segments. Each beam segment is routed around obstacles and then focused by a lens onto a target point. With such a laser beam welding system, it is not necessary to provide cutouts beneath the mixing vanes in the spacer grid assembly to weld the interior strips together. In addition, the laser beam segments may be moved while welding to provide a larger elongated weld having a smaller diameter.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
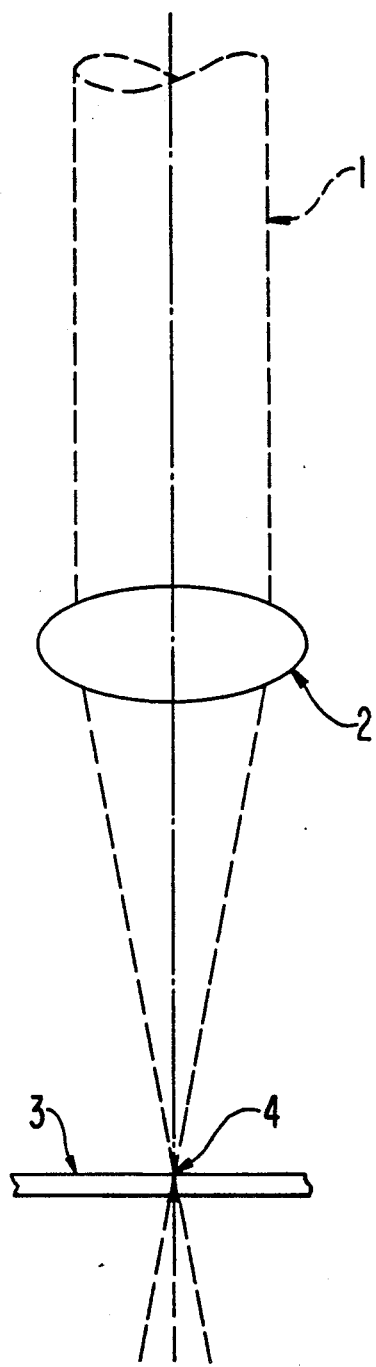
FIG. 1 illustrates a conventional laser beam welding system.
Figure 2:
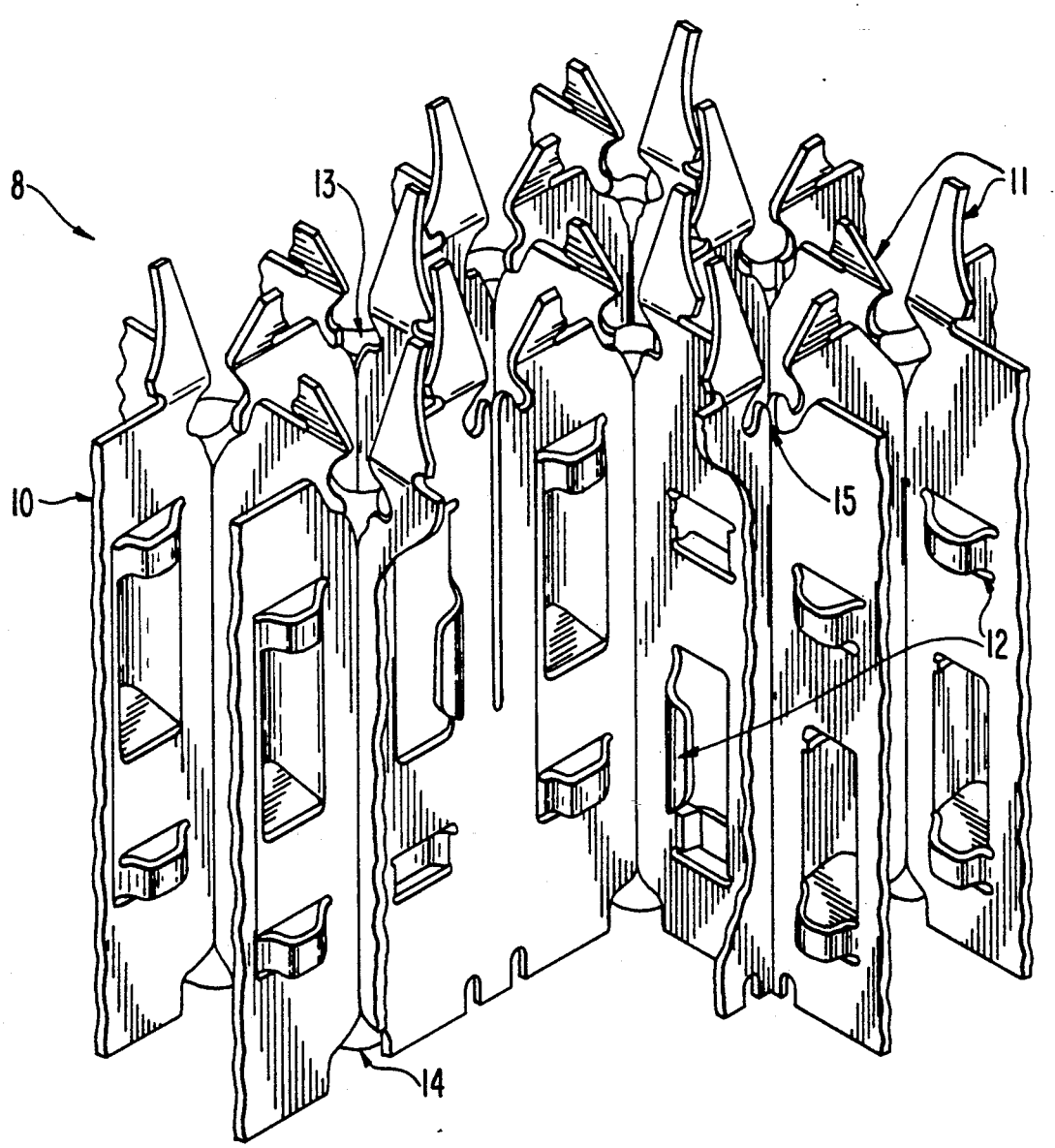
FIG. 2 illustrates a conventional spacer grid assembly.
Figure 3:
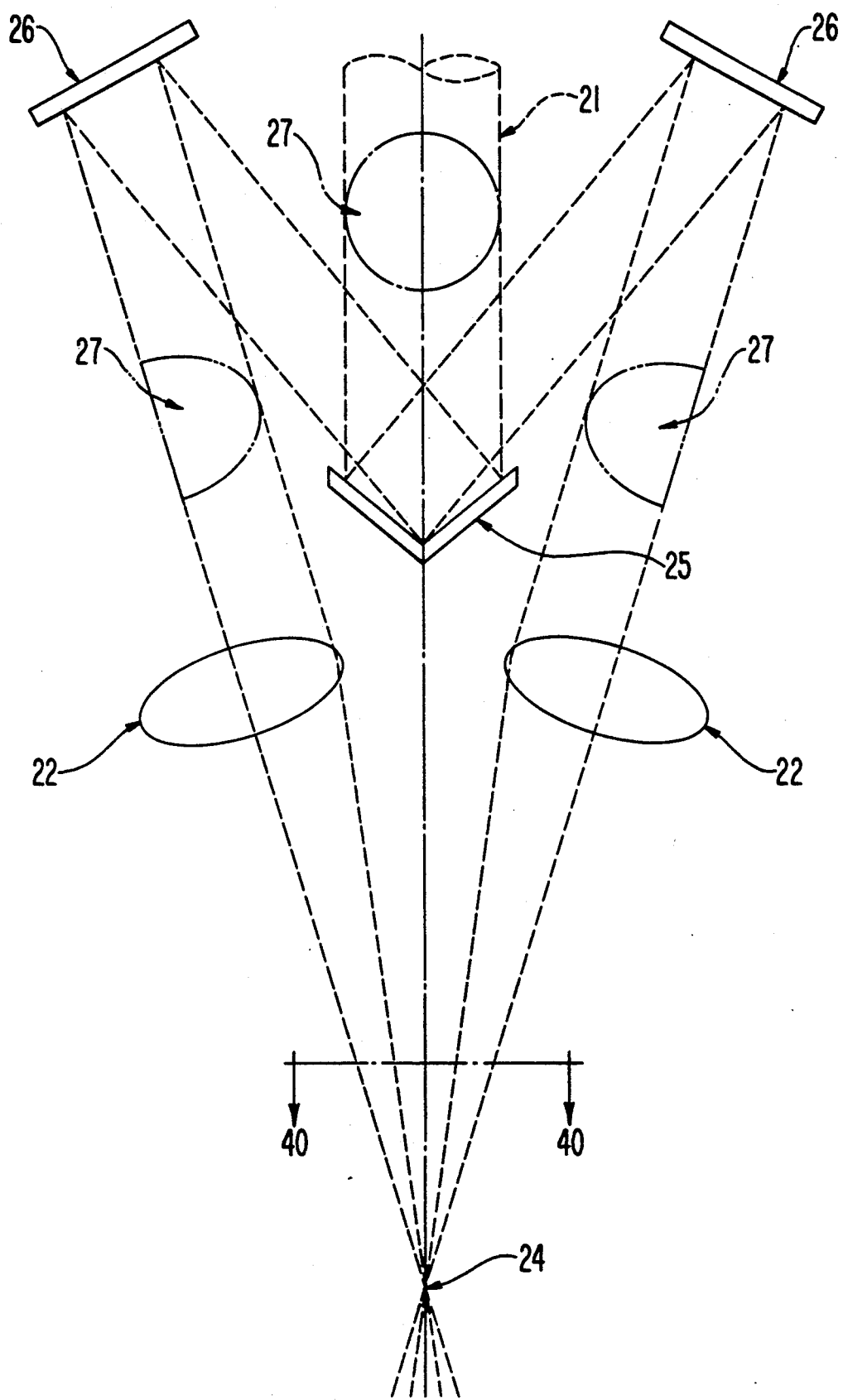
FIG. 3 illustrates an embodiment of the split beam laser welding system according to the invention.

FIG. 3 illustrates a schematic of a split beam laser welding system of the present invention. In FIG. 3, an incoming collimated laser beam 21 from a suitable laser beam source is divided into a plurality of beam segments. A suitable laser beam source is available from Raytheon Corp. under model No. SS 550-7. In this embodiment, a bifurcating mirror 25 is used to divide the laser beam 21 into two beam segments. As illustrated by the laser beam profiles 27, the incoming circular collimated laser beam is divided into two semicircular beam segments.

The beam segments may be routed around obstacles between the source and the point of welding by suitable means such as plane mirrors 26. After routing, the beam segments are then recombined and focused by focusing lenses 22. The focus and coincidence point 24 of the beam segments is the point at which welding occurs.

Figure 4:
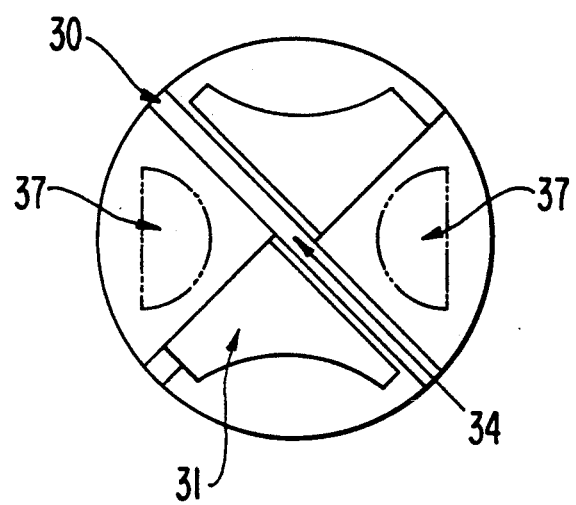
FIG. 4 illustrates a sectional view along line 40—40 in of FIG. 3 with an intersection of the spacer grid assembly.

FIG. 4 illustrates an application of the split beam laser welding system to a spacer grid assembly. The spacer grid assembly is typically comprised of zirconium alloy strips, but the split beam laser welding system is also applicable to other alloys such as inconel. As shown in FIG. 4, the laser beam segments 37 are directed into two quadrants of the interior strips 10 intersection in which the mixing vanes 31 are not present. Consequently, portions of the mixing vanes 31 do not need to be cut out to weld the interior strips 10. The DNB performance is thereby improved.

In producing the upper intersection welds 13, the laser beam segments 37 converge at a point 34 below the mixing vanes 31. The laser beams are applied symmetrically to the interior strips 10 thereby producing a symmetrical weld, To provide a stronger weld, the split beam laser welding system preferably creates an elongated small diameter weld at the intersection of the interior strips 10. By moving the focus and coincidence of the beam segments vertically down the intersection of the interior strips 10, molten metal is induced to flow down along the intersection of the interior strips 10 without spreading laterally. An elongated small diameter weld is thereby created. With such a weld, the detrimental effect on the coolant flow is reduced since the weld has a small diameter and the risk of buckling failure is reduced since the weld is elongated thereby having a larger interface with the interior strips 10.

The foregoing description of a preferred embodiment of the invention has been presented for purposes of illustration and description. It is not intended to be exhaustive or to limit the invention to the precise form disclosed, and obviously, many modifications and variations are possible in light of the above teaching. For example, although the laser beam has been shown as being divided into two beam segments, the laser beam may be divided into a greater number of segments. Also, alternate structure to the plate mirrors 26 may be used for directing the beam segments around suitable obstacles. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

What is claimed is:

1. A system for performing split beam laser welding of two workpieces comprising:
   (a) means for separating a laser beam into a plurality of beam segments;
   (b) means for directing said beam segments along separate beam paths; and
   (c) means for focusing said beam segments at an intersection of said two workpieces and onto different locations of contact between said two workpieces whereby welding of said workpieces occurs at said locations.

2. The system for performing laser welding as set forth in claim 1, wherein said means for separating said laser is comprised of a bifurcating mirror for splitting said laser beam into two beam segments.

3. The system for performing laser welding as set forth in claim 1, wherein said means for directing is comprised of plane mirrors and said means for focusing comprises focusing lenses.

4. A split beam laser welding system for use on a spacer grid assembly having mixing vanes comprising:
   (a) means for dividing an incoming collimated laser beam into a plurality of beam segments;
   (b) means for directing said beam segments along separate beam paths; and
   (c) focusing means for reducing said beam segments into points of light and for directing said points at an intersection of two strips of said spacer grid assembly, below said mixing vanes, and onto different locations of contact between said two strips whereby welding of said strips occurs at said locations.

5. The split beam laser welding system according to claim 4, wherein said points of light are moved down said intersection of said two strips to create an elongated weld.

6. The split beam laser welding system according to claim 4, wherein said means for dividing is comprised of a bifurcating mirror for dividing said incoming beam into two laser beams.

7. The split beam laser welding system according to claim 4, wherein said points are applied into two quadrants of said intersection which are opposite to each other and which do not contain said mixing vanes.

8. The split beam laser welding system according to claim 4, wherein said focusing means is comprised of a plurality of focusing lenses and said directing means is comprised of a plurality of plane mirrors.

9. A method for performing split beam laser welding of a spacer grid assembly having mixing vanes comprising the steps of:
   (a) dividing an incoming collimated laser beam into a plurality of beam segments;
   (b) directing said beam segments along separate beam paths;
   (c) focusing said beam segments into points of light; and
   (d) directing said points of light at an intersection of two strips of said spacer grid assembly, below said mixing vanes, and onto different locations of contact between said two strips thereby welding said strips at said intersection.

10. The method for split beam laser welding according to claim 9, wherein the step of directing further includes the step of moving said points down said intersection of said two strips to create an elongated weld.

11. The method for split beam laser welding according to claim 9, wherein the step of dividing divides said incoming beam into two laser beams.

12. The method for split beam laser welding according to claim 9, wherein the step of focusing and directing further comprises the step of applying said points into two quadrants of said intersection which are opposite to each other and which do not contain said mixing vanes.

13. The method for split beam laser welding according to claim 9, wherein said step of directing said beam segments comprises the step of reflecting said beam segments off a plurality of plane mirrors and said step of focusing said beam segments comprises the step of passing said beam segments through a plurality of focusing lenses.

* * * * *